No. 672,579. Patented Apr. 23, 1901.
R. WETHERILL.
EXHAUST HEAD CONDENSER.
(Application filed Oct. 4, 1900.)
(No Model.) 2 Sheets—Sheet 1.

FIG. 2ᵇ.

FIG. 1ᵃ.

WITNESSES.
Henry Drury
Percival H. Granger

INVENTOR.
Robt. Wetherill
By Chas. N. Butler
Attorney

No. 672,579. Patented Apr. 23, 1901.
R. WETHERILL.
EXHAUST HEAD CONDENSER.
(Application filed Oct. 4, 1900.)
(No Model.) 2 Sheets—Sheet 2.
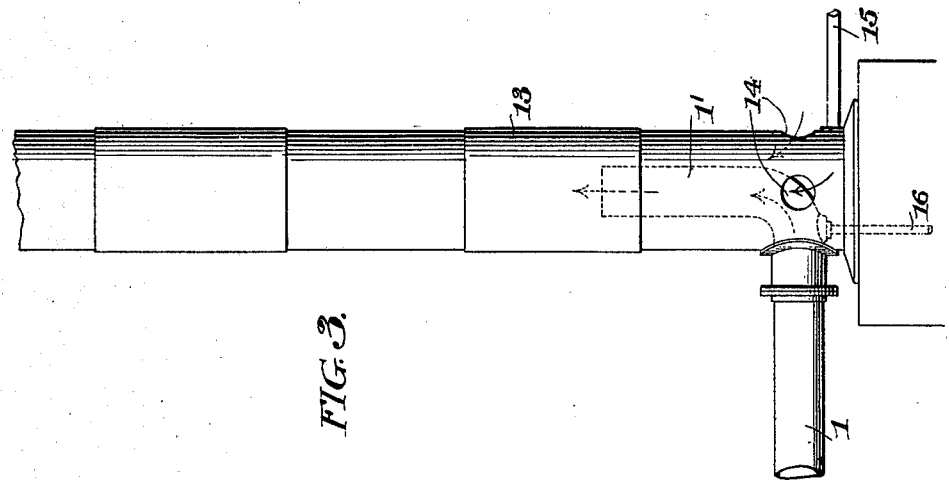
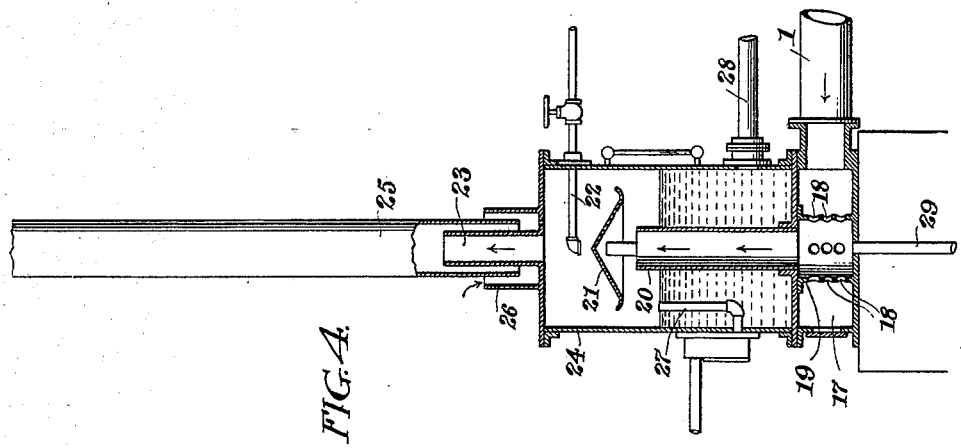
WITNESSES.
INVENTOR.
Robt. Wetherill
By Chas. N. Butler
Attorney

UNITED STATES PATENT OFFICE.

ROBERT WETHERILL, OF CHESTER, PENNSYLVANIA, ASSIGNOR TO ROBT. WETHERILL & COMPANY, OF SAME PLACE.

EXHAUST-HEAD CONDENSER.

SPECIFICATION forming part of Letters Patent No. 672,579, dated April 23, 1901.

Application filed October 4, 1900. Serial No. 31,968. (No model.)

*To all whom it may concern:*

Be it known that I, ROBERT WETHERILL, residing at Chester, in the county of Delaware and State of Pennsylvania, have invented an Improved Exhaust-Head Condenser, of which the following is a specification.

In the practice of my invention exhaust-steam is condensed by delivering it into a receptacle into which air is drawn, and the water thus condensed is drawn off to provide pure feed-water for the boilers, the steam which is not condensed passing off in a dry form. Improved means are provided for condensing the steam, collecting the water of condensation, utilizing the steam in furnishing hot feed-water for the boiler, and collecting the oil contained in the steam.

Figure 2:
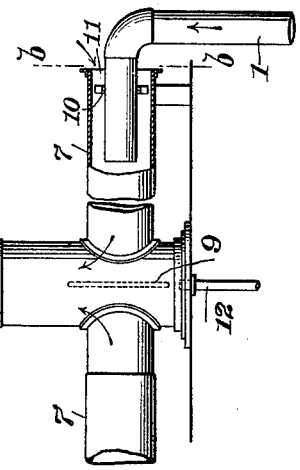
Figure 2:
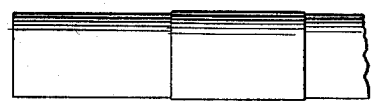
Figure 2:
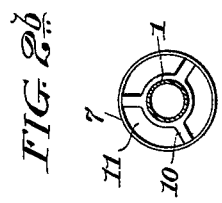
Figure 1:
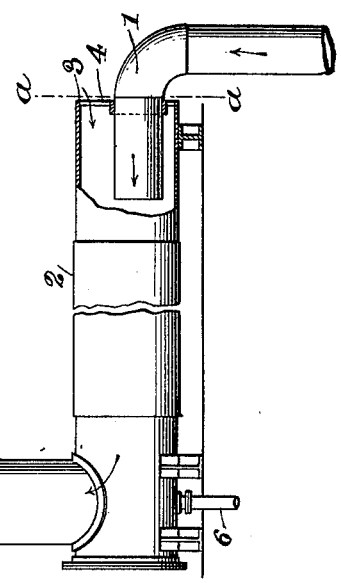
Figure 1:
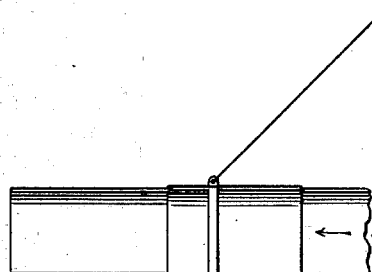
Figure 1:
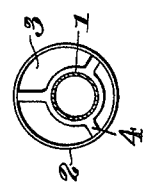

In the accompanying drawings, Figure 1 is a side elevation, partially in section, illustrating mechanism for condensing exhaust-steam and collecting the water of condensation in accordance with my invention. Fig. 1ª is a sectional view taken on the line *a a* of Fig. 1. Fig. 2 is a side elevation, partially in section, showing a form of my condensing and collecting apparatus which may be employed with a plurality of exhausts. Fig. 2ᵇ is a sectional view taken on the line *b b* of Fig. 2. Fig. 3 is a side elevation of a form of the invention in which the exhaust-steam is delivered directly into the stack; and Fig. 4 is a sectional elevation of a feed-water heater in which the exhaust-steam is utilized in furnishing hot feed-water, to which the water of condensation is added and by which the oil contained in the steam is collected.

Referring to Fig. 1 of the drawings, the exhaust-steam is delivered from the engine to the condenser by the pipe 1, which is carried into the drum or condensing-chamber 2 through the open end 3 thereof. A spider 4, sustained by the drum, supports the pipe and permits air to be drawn in through the open end of the condensing-receptacle by the action of the steam. The cold air thus drawn in cools the interior surface of the condensing-receptacle and that of the stack 5, leading therefrom, through which the mingled air and steam passes, condensation taking place through the action of the cool condensing-surfaces and of the cold air upon the steam. The water of condensation is collected and carried off by the pipe 6, by which pure water may be supplied to the boilers, and any steam escaping from the stack passes off in a dry form.

In Fig. 2 of the drawings two drums or condensing-receptacles 7 7 are shown joined to a stack 8, containing a plate 9 for separating the outlets from these drums into the stack. In this case each of the drums 7 is designed to receive steam from an exhaust-pipe 1, corresponding thereto and sustained therein by a spider 10, air being drawn in through the open end 11 of each drum, mingling with the steam and cooling the condensing-surfaces, as previously described. The water thus condensed is collected and carried off by means of the pipe 12 for boiler feed-water. This form of construction permits the employment of a single exhaust-head condenser with a plurality of exhausts.

In Fig. 3 the exhaust-pipe 1 is provided with an extension 1', which is carried into the stack 13, into which the steam is directly delivered. At the base of the stack apertures 14 are formed, through which air is drawn for combination with the steam and to cool the interior or condensing surface of the stack. The water of condensation is carried off through the pipe 15, leading from the base of the stack, and any condensation taking place in the pipe 1 or 1' is carried off with the oil through the pipe 16.

Referring to Fig. 4, in this construction the exhaust-pipe 1 delivers steam into a chamber 17, from which it passes through the perforations 18 into a chamber 19 and thence upward through the passage 20 against the hood or dome 21, supported thereby. A pipe 22 delivers water upon the dome 21, by which it is kept cool, and feed-water is supplied to the heating and condensing chamber 24. The steam that is not condensed escapes over the dome 21 through the outlet 23 into the stack 25, where it is condensed by cold air drawn in through the openings between the stack, the outlet 23, and the tubular box 26. The water of condensation from the stack flows into the heating-chamber 24, in which the desired water-level is maintained by the overflow-pipe 27. The water in the chamber 24 heated by the action of the steam in the operation described is carried to the boilers through the pipe 28, and any water or oil separated from the steam before leaving the passage 20 is carried to a drain by the pipe 29. The oil or lubricant contained in the exhaust-steam is separated therefrom while passing through the apertures 18.

Having described my invention, I claim—

1. In an exhaust-head condenser, a steam-condensing conduit comprising a condensing-chamber and a stack connected therewith, a pipe for delivering steam to said condensing-chamber, and a cold-air inlet which distributes air around the interior surface of said conduit, in combination with mechanism for delivering feed-water to said chamber, substantially as specified.

2. In an exhaust-head condenser, a steam-conduit, a hood or dome above the outlet from said conduit, a pipe for flowing water upon said hood, and a receptacle surrounding said conduit for collecting the water flowed upon said hood and the water of condensation, substantially as specified.

3. In an exhaust-head condenser, a steam-conduit, a hood or dome above the outlet from said conduit, a pipe for flowing water upon said hood, a receptacle surrounding said conduit, a stack and an outlet from said receptacle extending into the open end of said stack, substantially as specified.

4. In an exhaust-head condenser, a steam-conduit, a hood above the outlet from said conduit, a pipe for flowing water upon said hood, a receptacle surrounding said conduit for collecting the water flowed upon said hood and the water of condensation, an overflow-pipe, and a pipe for drawing off water from said receptacle, substantially as specified.

5. In an exhaust-head condenser, a steam receptacle or chamber, in combination with a steam-conduit connected with said chamber by perforations permitting the passage of steam therethrough and adapted for separating oil therefrom, substantially as specified.

6. In an exhaust-head condenser, a steam receptacle or chamber, a steam-conduit connected with said chamber by openings permitting the passage of steam therethrough and separating the oil therefrom, a hood or dome above the outlet from said conduit, a pipe for flowing water upon said hood, and a receptacle for collecting said water and the water of condensation, substantially as specified.

In testimony whereof I have hereunto set my hand this 29th day of September, 1900.

ROBT. WETHERILL.

Witnesses:
FRANK L. PERKINS,
JAS. C. BAKER.